(No Model.)

C. R. SCHMIDT.
FLEXIBLE ELBOW FOR CONNECTING PIPES.

No. 561,442. Patented June 2, 1896.

Witnesses:

Charles R. Schmidt
Inventor.
by Connolly Bro
Atty.

UNITED STATES PATENT OFFICE.

CHARLES R. SCHMIDT, OF BALTIMORE, MARYLAND.

FLEXIBLE ELBOW FOR CONNECTING PIPES.

SPECIFICATION forming part of Letters Patent No. 561,442, dated June 2, 1896.

Application filed August 16, 1895. Serial No. 559,525. (No model.)

*To all whom it may concern:*

Be it known that I, CHARLES R. SCHMIDT, a citizen of the United States, residing at Baltimore, in the State of Maryland, have invented certain new and useful Improvements in Flexible Elbows for Connecting Pipes; and I do hereby declare the following to be a full, clear, and exact description of the invention, such as will enable others skilled in the art to which it appertains to make and use the same.

This invention has relation to flexible elbows for water-closet connections, and has for its object the provision of novel means for producing a water-tight joint and for preventing the joint from being accidentally loosened or impaired.

The invention consists in the novel construction and combination of parts hereinafter described and claimed.

Figure 1:
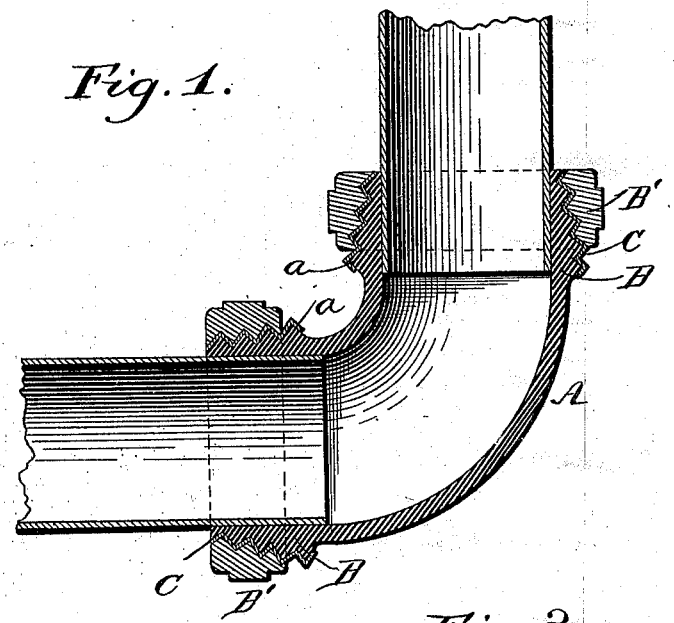
Figure 2:
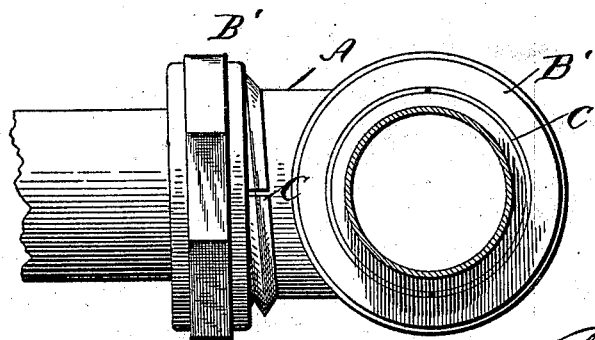

In the accompanying drawings, Figure 1 is a vertical central section of a flexible elbow embodying my invention. Fig. 2 is a plan view of the same.

A designates the elbow, made of soft rubber or other suitable material and having collars B B molded on its ends. The interiors of these collars are preferably smooth and adapted to admit of the easy insertion and withdrawal of the metal pipes when the rubber is not compressed. Such compression, however, is necessary for obtaining a tight joint, and is provided for by tapering the collars exteriorly, forming screw-threads $a$ on such tapered portions and fitting thereon the interiorly-tapered metallic nuts B', which latter, when screwed home, compress the rubber and force it tightly against the surface of the pipes. The mechanical tightness and solidity of the joint depend on the force brought to bear on the nut and the extent to which it is forced on the threaded portion of the collars, and hence may be nicely adjusted or readjusted. Any tendency of the joint to become loose or leaky is compensated for by a further tightening of the nut. To relieve friction between the elastic material at the threads and the tapered nut B, a split sheet-metal ring C may be inserted, fitting the grooves of the taper-thread.

Having described my invention, what I claim is—

A flexible connection for pipes consisting of a section of flexible material having a tapered screw-threaded collar on its end in combination with a correspondingly screw-threaded sheet-metal ring fitting said collar, and a nut screwing over said ring, substantially as described.

In testimony whereof I affix my signature in presence of two witnesses.

CHARLES R. SCHMIDT.

Witnesses:
 CHAS. H. SHIPLEY,
 GEO. MCCAFFRAY.